(No Model.)
A. EDGELL.
NUT LOCK.
No. 291,039. Patented Jan. 1, 1884.
Fig. 1.
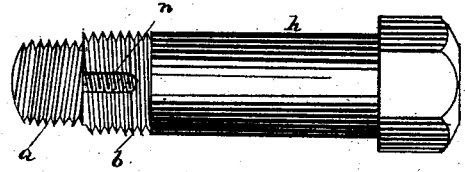
Fig. 2. Fig. 3.
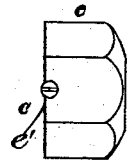 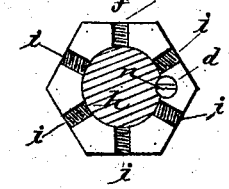
Fig. 4.
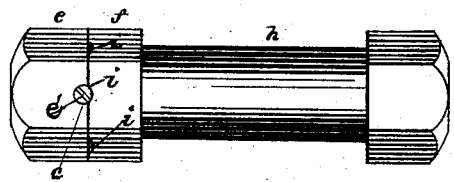
Witnesses
W. P. Preston
Saml V. Essick
Inventor
Aaron Edgell

UNITED STATES PATENT OFFICE.

AARON EDGELL, OF NEWPORT, OHIO.

NUT-LOCK.

SPECIFICATION forming part of Letters Patent No. 291,039, dated January 1, 1884.

Application filed May 24, 1883. (No model.)

*To all whom it may concern:*

Be it known that I, AARON EDGELL, residing at Newport, in the county of Washington and State of Ohio, have invented a new and useful Nut-Lock, of which the following is a specification.

My invention relates to an improvement in nut-locks, in which I use a bolt, on the end of which I have a right and left-handed thread, the inside thread being for the chief nut, and the outside thread being for the jam-nut. I also use as an additional provision in the said lock, set-screws, as shown in Figures 3 and 4 of the drawings accompanying this specification.

In reference to the accompanying drawings, Fig. 1 is a view of the bolt showing the right and left screw. Fig. 2 is a side view of the jam-nut. Fig. 3 is a top view of the inside nut and of the bolt in section. Fig. 4 is a view of the nuts in position on the bolt.

Similar letters refer to similar parts throughout the several views.

$a$ is a left-handed screw, and $b$ is a right-handed screw, both cut upon the end of the bolt $h$.

$n$ is a screw-threaded cavity cut in the screw $b$ for receiving a portion of the screw $d$. Said cavity corresponds with the position of the screw $d$ in its relationship to the circle forming the hole in the nut $f$.

$e$ is a side view of the jam-nut.

$c$ is a view of the set-screw by which the said nut is held in position, by occupying its position in screw-threaded cavity $e'$ of the nut $e$, and also projecting into either of the screw-threaded cavities $i$ of the nut $f$.

$h$ is a view of the bolt.

The operation of my invention may be described as follows: When the nut $f$ is driven to its destination on the bolt $h$, the screw $d$ is inserted and driven to the position shown at $d$, thus filling the cavity $n$ of the bolt $h$. The jam-nut $e$ is then driven to its destination, and the screw $c$ is set in the position shown in Fig. 4.

What I claim as my invention, and desire to secure by Letters Patent, is—

1. The combination of the bolt $h$, having right and left handed screw-threads, the nut $f$, having screw-threaded recesses $i$, the set-screw $c$, and the nut $e$, having the screw-threaded cavity $e'$.

2. The combination of the bolt $h$ with its right and left handed screws and screw-threaded cavity $n$, the nuts $e$ and $f$, having screw-threaded cavities $e'$ and $i$, and the screws $c$ and $d$.

AARON EDGELL.

Witnesses:
W. P. PRESTON,
SAML. V. ESSICK.